US011967287B2

(12) United States Patent
Lee et al.

(10) Patent No.: US 11,967,287 B2
(45) Date of Patent: Apr. 23, 2024

(54) COLUMN DRIVER INTEGRATED CIRCUIT FOR LOW-POWER DRIVING AND DEVICES INCLUDING THE SAME

(71) Applicant: SAMSUNG ELECTRONICS CO., LTD., Suwon-si (KR)

(72) Inventors: Donghan Lee, Busan (KR); Yong-Hun Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/950,599

(22) Filed: Sep. 22, 2022

(65) Prior Publication Data

US 2023/0111814 A1 Apr. 13, 2023

(30) Foreign Application Priority Data

Oct. 8, 2021 (KR) ........................ 10-2021-0134302
Apr. 18, 2022 (KR) ........................ 10-2022-0047805

(51) Int. Cl.
*G09G 3/3275* (2016.01)
*G09G 3/20* (2006.01)

(52) U.S. Cl.
CPC ......... *G09G 3/3275* (2013.01); *G09G 3/2007* (2013.01); *G09G 2310/027* (2013.01); *G09G 2310/0291* (2013.01); *G09G 2330/023* (2013.01); *G09G 2330/028* (2013.01)

(58) Field of Classification Search
CPC .................................................... G09G 3/3275
USPC ......................................................... 345/74.1
See application file for complete search history.

(56) References Cited

U.S. PATENT DOCUMENTS

| | | | | |
|---|---|---|---|---|
| 8,860,704 | B2 | 10/2014 | Lee | |
| 9,761,178 | B2 | 9/2017 | Park et al. | |
| 10,078,980 | B2 | 9/2018 | Kong et al. | |
| 2005/0104831 | A1 | 5/2005 | Hoshino | |
| 2007/0070061 | A1 | 3/2007 | Koyama | |
| 2011/0084953 | A1 | 4/2011 | Lee et al. | |
| 2017/0270889 | A1* | 9/2017 | Kang | G09G 3/3688 |
| 2017/0309219 | A1* | 10/2017 | Kong | G09G 3/2003 |
| 2020/0105186 | A1* | 4/2020 | Shin | G09G 3/2003 |

FOREIGN PATENT DOCUMENTS

| | | | |
|---|---|---|---|
| KR | 10-2006-0134371 | A | 12/2006 |
| KR | 10-1973405 | B1 | 4/2019 |

* cited by examiner

*Primary Examiner* — Long D Pham
(74) *Attorney, Agent, or Firm* — Sughrue Mion, PLLC

(57) ABSTRACT

A column driver integrated circuit (IC) which drives a first group of pixel lines connected to a first group of pixels included in a display panel, and a second group of pixel lines connected to a second group of pixels included in the display panel, the column driver IC including: a master gray scale voltage generation circuit configured to divide a reference voltage to generate tap voltages, and to generate a first low-power mode gray scale voltage based on at least one of the tap voltages; and a first low-power mode amplifier configured to drive the first group of pixel lines based on the first low-power mode gray scale voltage.

19 Claims, 7 Drawing Sheets

COLUMN DRIVER INTEGRATED CIRCUIT FOR LOW-POWER DRIVING AND DEVICES INCLUDING THE SAME

CROSS-REFERENCE TO RELATED APPLICATIONS

This application is based on and claims priority under 35 U.S.C. § 119 to Korean Patent Application No. 10-2021-0134302, filed on Oct. 8, 2021, and Korean Patent Application No. 10-2022-0047805, filed on Apr. 18, 2022, in the Korean Intellectual Property Office, the disclosures of which are incorporated by reference herein in their entireties.

BACKGROUND

The present disclosure relates to a column driver integrated circuit (IC), and more particularly, relate to a column driver IC with a structure capable of reducing power consumption due to a static current flowing in source amplifiers in a low-power mode and devices including the same.

A liquid crystal display (LCD) may be a passive display incapable of emitting by itself may use a back light as a light source.

An organic light emitting diode (OLED) display may emit a light by itself using a red pixel, a green pixel, and a blue pixel, and therefore may not use a back light. The OLED display may express characters or an image by using an organic material, which emits a light by itself when a current flows through the organic material, as a pixel.

Power consumption of the LCD may be uniform. However, when the screen brightness of the OLED display is dark, power consumption of the OLED display may decrease, and when the screen brightness of the OLED display is bright, power consumption of the OLED display may increase.

A column driver IC, which may be referred to as a display driver IC, may be a semiconductor chip used to drive pixels included in the LCD or OLED display.

Signals output from a processor (e.g., an application processor or a central processing unit (CPU)) may be transferred to the column driver IC through a printed circuit board (PCB), and the column driver IC may process the signals and express characters or an image through the pixels by using the processed signals.

Depending on a size of a display panel or the number of colors to be expressed in the display panel, one column driver IC or several tens of column driver ICs may be installed in a display device.

SUMMARY

Provided are a column driver IC capable of driving pixel lines implemented in a display panel by using a low-power gray scale voltage generated based on at least one of tap voltages generated by a master gray scale voltage generation circuit for the purpose of reducing power consumption due to a static current flowing in source amplifiers in a low-power mode, and devices including the same.

Additional aspects will be set forth in part in the description which follows and, in part, will be apparent from the description, or may be learned by practice of the presented embodiments.

In accordance with an aspect of the disclosure, a column driver integrated circuit (IC) which drives a first group of pixel lines connected to a first group of pixels included in a display panel, and a second group of pixel lines connected to a second group of pixels included in the display panel, the column driver IC including: a master gray scale voltage generation circuit configured to divide a reference voltage to generate tap voltages, and to generate a first low-power mode gray scale voltage based on at least one of the tap voltages; and a first low-power mode amplifier configured to drive the first group of pixel lines based on the first low-power mode gray scale voltage.

In accordance with an aspect of the disclosure, a column driver IC module includes a first column driver IC configured to drive a first group of pixel lines included in a display panel; and a second column driver IC configured to drive a second group of pixel lines included in the display panel, wherein the first column driver IC including: a first master gray scale voltage generation circuit configured to divide a first reference voltage to generate first tap voltages, and to generate a first low-power mode gray scale voltage using at least one of the first tap voltages; and a first low-power mode amplifier configured to drive the first group of pixel lines based on the first low-power mode gray scale voltage.

In accordance with an aspect of the disclosure, a display device includes a display panel including a first group of pixel lines connected to a first group of pixels, and a second group of pixel lines connected to a second group of pixels; and a column driver IC module including a first column driver IC connected to the first group of pixel lines and a second column driver IC connected to the second group of pixel lines, wherein the first column driver IC includes a first master gray scale voltage generation circuit configured to divide a first reference voltage to generate first tap voltages, and to generate a first low-power mode gray scale voltage based on at least one of the first tap voltages; and a first low-power mode amplifier configured to drive the first group of pixel lines based on the first low-power mode gray scale voltage.

In accordance with an aspect of the disclosure, a column driver integrated circuit (IC) which drives a plurality of pixel lines connected to a plurality of pixels included in a display panel, the column driver IC including a master gray scale voltage generation circuit configured to: divide a reference voltage to generate a plurality of tap voltages, and generate a low-power mode gray scale voltage based on at least one of the plurality of tap voltages; a plurality of normal-mode amplifiers configured to drive the plurality of pixel lines based on gray scale voltages corresponding to the plurality of tap voltages based on the column driver IC operating in a normal mode; a low-power mode amplifier configured to drive the plurality of pixel lines using the low-power mode gray scale voltage based on the column driver IC operating in a low-power mode.

BRIEF DESCRIPTION OF THE FIGURES

The above and other aspects, features, and advantages of certain embodiments of the present disclosure will be more apparent from the following description taken in conjunction with the accompanying drawings, in which.

DETAILED DESCRIPTION

Figure 1:
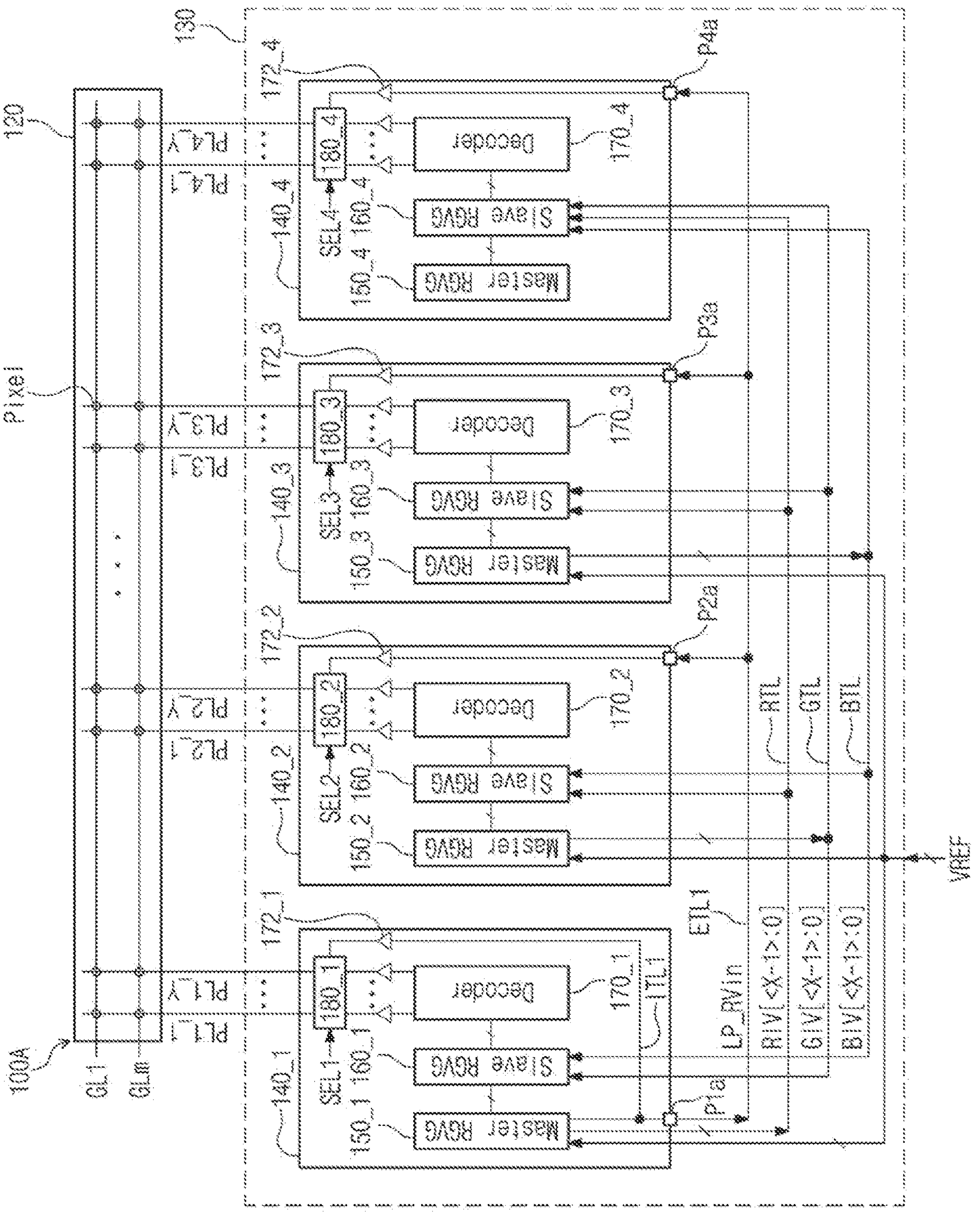
FIG. 1 is a block diagram of a display device including column driver ICs according to an embodiment.

FIG. 1 is a block diagram of a display device including column driver ICs according to an embodiment of the present disclosure.

Referring to FIG. 1, a display device 100A includes a display panel 120 and a column driver IC module 130, and the column driver IC module 130 includes a plurality of column driver ICs 140_1 to 140_4, an external transmission line ETL1, red tap voltage transmission lines RTL, green tap voltage transmission lines GTL, and blue tap voltage transmission lines BTL.

Display devices 100A, 100A', 100B, and 100C discussed herein may be, for example, one or more of a television (TV), a smart TV, or a memory device. The memory device may be, for example, one or more of a smartphone, a laptop computer, a tablet PC, or a mobile Internet device (MID), but embodiments are not limited thereto.

The display panel 120 includes "m" gate lines GL1 to GLm (where m is a natural number of 2 or more), a plurality of pixel lines PL1_1 to PL1_Y, PL2_1 to PL2_Y, PL3_1 to PL3_Y, and PL4_1 to PL4_Y (where Y is a natural number of 2 or more), and a plurality of pixels. Each of the plurality of pixels is connected with each of the "m" gate lines GL1 to GLm and each of the plurality of pixel lines PL1_1 to PL1_Y, PL2_1 to PL2_Y, PL3_1 to PL3_Y, and PL4_1 to PL4_Y.

According to an embodiment, each of the plurality of pixels may be an OLED or an active-matrix organic light-emitting diode (AMOLED). Some of the plurality of pixels are pixels emitting a light of a red color, others of the plurality of pixels are pixels emitting a light of a green color, and the others of the plurality of pixels are pixels emitting a light of a blue color.

For convenience of description, four column driver ICs 140_1 to 140_4 are illustrated in FIG. 1, but embodiments are not limited thereto.

Each of the column driver ICs 140_1 to 140_4 may be referred to as a data line driver, and each of the pixel lines PL1_1 to PL1_Y, PL2_1 to PL2_Y, PL3_1 to PL3_Y, and PL4_1 to PL4_Y may be referred to as a data line.

The first column driver IC 140_1 that drives the first group of pixel lines PL1_1 to PL1_Y includes a first master gray scale voltage generation circuit 150_1, a first slave gray scale voltage generation circuit 160_1, a first decoder 170_1, a first group of source amplifiers driving the first group of pixel lines PL1_1 to PL1_Y in a normal mode, a first low-power mode amplifier 172_1 driving the first group of pixel lines PL1_1 to PL1_Y in a low-power mode, a first switch circuit 180_1, an internal transmission line ITL1, and a first pin P1*a*. In embodiments, and as illustrated for example in FIGS. 1-2, 4-5, and 7, a gray scale voltage generation circuit may be referred to as a reference gray scale voltage generator (RGVG). According to embodiments, a gray scale voltage may be referred to as a gamma voltage.

The first switch circuit 180_1 transfers output signals of the first group of source amplifiers to the first group of pixel lines PL1_1 to PL1_Y in response to a first selection signal SEL1 indicating the normal mode, and transfers an output signal of the first low-power mode amplifier 172_1 to the first group of pixel lines PL1_1 to PL1_Y in response to the first selection signal SEL1 indicating the low-power mode.

The second column driver IC 140_2 that drives a second group of pixel lines PL2_1 to PL2_Y includes a second master gray scale voltage generation circuit 150_2, a second slave gray scale voltage generation circuit 160_2, a second decoder 170_2, a second group of source amplifiers driving the second group of pixel lines PL2_1 to PL2_Y in the normal mode, a second low-power mode amplifier 172_2 driving the second group of pixel lines PL2_1 to PL2_Y in the low-power mode, a second switch circuit 180_2, and a second pin P2*a*.

The second switch circuit 180_2 transfers output signals of the second group of source amplifiers to the second group of pixel lines PL2_1 to PL2_Y in response to a second selection signal SEL2 indicating the normal mode, and transfers an output signal of the second low-power mode amplifier 172_2 to the second group of pixel lines PL2_1 to PL2_Y in response to the second selection signal SEL2 indicating the low-power mode.

The third column driver IC 140_3 that drives a third group of pixel lines PL3_1 to PL3_Y includes a third master gray scale voltage generation circuit 150_3, a third slave gray scale voltage generation circuit 160_3, a third decoder 170_3, a third group of source amplifiers driving the third group of pixel lines PL3_1 to PL3_Y in the normal mode, a third low-power mode amplifier 172_3, a third switch circuit 180_3, and a third pin P3*a*.

The third switch circuit 180_3 transfers output signals of the third group of source amplifiers to the third group of pixel lines PL3_1 to PL3_Y in response to a third selection signal SEL3 indicating the normal mode, and transfers an output signal of the third low-power mode amplifier 172_3 to the third group of pixel lines PL3_1 to PL3_Y in response to the third selection signal SEL3 indicating the low-power mode.

The fourth column driver IC 140_4 that drives a fourth group of pixel lines PL4_1 to PL4_Y includes a fourth master gray scale voltage generation circuit 150_4, a fourth slave gray scale voltage generation circuit 160_4, a fourth decoder 170_4, a fourth group of source amplifiers driving the fourth group of pixel lines PL4_1 to PL4_Y in the normal mode, a fourth low-power mode amplifier 172_4 driving the fourth group of pixel lines PL4_1 to PL4_Y in the low-power mode, a fourth switch circuit 180_4, and a fourth pin P4*a*.

The fourth switch circuit 180_4 transfers output signals of the fourth group of source amplifiers to the fourth group of pixel lines PL4_1 to PL4_Y in response to a fourth selection signal SEL4 indicating the normal mode, and transfers an output signal of the fourth low-power mode amplifier 172_4 to the fourth group of pixel lines PL4_1 to PL4_Y in response to the fourth selection signal SEL4 indicating the low-power mode. When each of the column driver ICs 140_1 to 140_4 operates in the low-power mode, each of the selection signals SEL1 to SEL4 indicates the low-power mode.

The first master gray scale voltage generation circuit 150_1 divides received reference voltages VREF to generate red tap voltages RIV[<X−1>:0] (where X is a natural number of 2 or more), outputs the red tap voltages RIV[<X−1>:0] directly to the first slave gray scale voltage generation circuit 160_1, and outputs the red tap voltages RIV[<X−1>:

0] to each of the slave gray scale voltage generation circuits 160_2, 160_3, and 160_4 through the red tap voltage transmission lines RTL.

The first master gray scale voltage generation circuit 150_1 may generate a low-power mode gray scale voltage LP_RVin by using at least one of the red tap voltages RIV[<X−1>:0] and may output the low-power mode gray scale voltage LP_RVin to an input terminal of the first low-power mode amplifier 172_1 through the internal transmission line ITL1. The low-power mode gray scale voltage LP_RVin is transferred to the external transmission line ETL1 through the first pin P1*a*.

Because each of the pins P2*a*, P3*a*, and P4*a* implemented in each of the column driver ICs 140_2, 140_2, and 140_3 are connected with the external transmission line ETL1, the low-power mode gray scale voltage LP_RVin generated by the first master gray scale voltage generation circuit 150_1 in the low-power mode is transferred to each of input terminals of the low-power mode amplifiers 172_2, 172_3, and 172_4 through each of the pins P2*a*, P3*a*, and P4*a*.

The second master gray scale voltage generation circuit 150_2 divides the received reference voltages VREF to generate green tap voltages GIV[<X−1>:0], outputs the green tap voltages GIV[<X−1>:0] directly to the second slave gray scale voltage generation circuit 160_2, and outputs the green tap voltages GIV[<X−1>:0] to each of the slave gray scale voltage generation circuits 160_1, 160_3, and 160_4 through the green tap voltage transmission lines GTL.

The third master gray scale voltage generation circuit 150_3 divides the received reference voltages VREF to generate blue tap voltages BIV[<X−1>:0], outputs the blue tap voltages BIV[<X−1>:0] directly to the third slave gray scale voltage generation circuit 160_3, and outputs the blue tap voltages BIV[<X−1>:0] to each of the slave gray scale voltage generation circuits 160_1, 160_2, and 160_4 through the blue tap voltage transmission lines BTL.

According to embodiments, the fourth master gray scale voltage generation circuit 150_4 may divide the received reference voltages VREF to generate corresponding tap voltages and may output or may not output the corresponding tap voltages to the fourth slave gray scale voltage generation circuit 160_4. According to embodiments, a structure of the fourth master gray scale voltage generation circuit 150_4 may be identical to a structure of the first master gray scale voltage generation circuit 150_1.

As illustrated in FIG. 1, a gray scale voltage that is input to each of the input terminals of the low-power mode amplifiers 172_1 to 172_4 of each of the column driver ICs 140_1 to 140_4 is the low-power mode gray scale voltage LP_RVin generated within the first column driver IC 140_1. Each of the low-power mode amplifiers 172_1 to 172_4 may be an amplifier that is enabled in the low-power mode.

Figure 2:
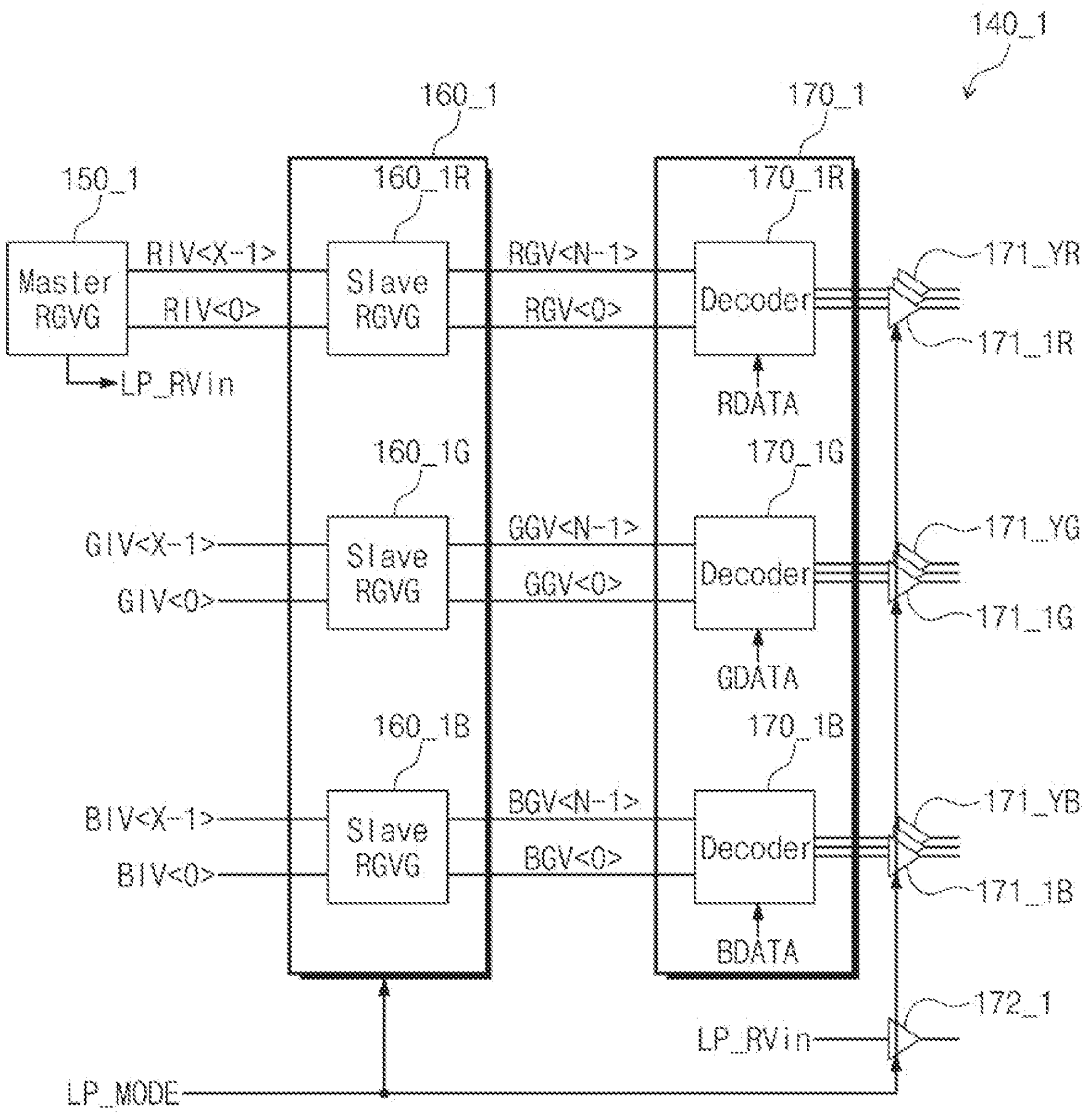
FIG. 2 is a detailed circuit diagram of a first slave gray scale voltage generation circuit and a first decoder included in a first column driver IC illustrated in FIG. 1, according to an embodiment.

FIG. 2 is a detailed circuit diagram of a first slave gray scale voltage generation circuit and a first decoder included in a first column driver IC illustrated in FIG. 1.

Referring to FIGS. 1 and 2, the first slave gray scale voltage generation circuit 160_1 includes a red gray scale voltage generation circuit 160_1R, a green gray scale voltage generation circuit 160_1G, and a blue gray scale voltage generation circuit 160_1B.

The red gray scale voltage generation circuit 160_1R generates red gray scale voltages RGV[<N−1>: 0] by receiving and dividing the red tap voltages RIV[<X−1>:0] generated by the first master gray scale voltage generation circuit 150_1. Herein, each of "X" and "N" is a natural number of 2 or more.

The green gray scale voltage generation circuit 160_1G generates green gray scale voltages GGV[<N−1>: 0] by receiving and dividing the green tap voltages GIV[<X−1>: 0] generated by the second master gray scale voltage generation circuit 150_2.

The blue gray scale voltage generation circuit 160_1B generates blue gray scale voltages BGV[<N−1>: 0] by receiving and dividing the blue tap voltages BIV[<X−1>:0] generated by the third master gray scale voltage generation circuit 150_3. For example, when each of red display data RDATA, green display data GDATA, and blue display data BDATA is 8-bit data, "N" may be 256 (=$2^8$).

The first decoder 170_1 includes a red decoder 170_1R, a green decoder 170_1G, and a blue decoder 170_1B.

The red decoder 170_1R selects a red gray scale voltage corresponding to the red display data RDATA from the red gray scale voltages RGV[<N−1>:0].

The green decoder 170_1G selects a green gray scale voltage corresponding to the green display data GDATA from the green gray scale voltages GGV[<N−1>:0].

The blue decoder 170_1B selects a blue gray scale voltage corresponding to the blue display data BDATA from the blue gray scale voltages BGV[<N−1>:0].

The first group of source amplifiers that drive the first group of pixel lines PL1_1 to PL1_Y include red source amplifiers 171_1R to 171_YR, green source amplifiers 171_1G to 171_YG, and blue source amplifiers 171_1B to 171_YB.

According to embodiments, pixel lines that are driven by the red source amplifiers 171_1R to 171_YR are some of the first group of pixel lines PL1_1 to PL1_Y; pixel lines that are driven by the green source amplifiers 171_1G to 171_YG are others of the first group of pixel lines PL1_1 to PL1_Y; pixel lines that are driven by the blue source amplifiers 171_1B to 171_YB are the others of the first group of pixel lines PL1_1 to PL1_Y.

The second column driver IC 140_2 includes the second master gray scale voltage generation circuit 150_2 generating the green tap voltages GIV[<X−1>:0], and the second slave gray scale voltage generation circuit 160_2 may be identical or similar in structure to the first slave gray scale voltage generation circuit 160_1.

A red gray scale voltage generation circuit included in the second slave gray scale voltage generation circuit 160_2 generates the red gray scale voltages RGV[<N−1>:0] by receiving and dividing the red tap voltages RIV[<X−1>:0] generated by the first master gray scale voltage generation circuit 150_1 through the red tap voltage transmission lines RTL.

A green gray scale voltage generation circuit included in the second slave gray scale voltage generation circuit 160_2 generates the green gray scale voltages GGV[<N−1>: 0] by receiving and dividing the green tap voltages GIV[<X−1>: 0] generated by the second master gray scale voltage generation circuit 150_2.

A blue gray scale voltage generation circuit included in the second slave gray scale voltage generation circuit 160_2 generates the blue gray scale voltages BGV[<N−1>:0] by receiving and dividing the blue tap voltages BIV[<X−1>:0] generated by the third master gray scale voltage generation circuit 150_3 through the blue tap voltage transmission lines BTL.

The third column driver IC 140_3 includes the third master gray scale voltage generation circuit 150_3 generating the blue tap voltages BIV[<X−1>:0], and the third slave gray scale voltage generation circuit 160_3 may be identical or similar in structure to the first slave gray scale voltage generation circuit 160_1.

A red gray scale voltage generation circuit included in the third slave gray scale voltage generation circuit 160_3 generates the red gray scale voltages RGV[<N−1>:0] by receiving and dividing the red tap voltages RIV[<X−1>:0] generated by the first master gray scale voltage generation circuit 150_1 through the red tap voltage transmission lines RTL.

A green gray scale voltage generation circuit included in the third slave gray scale voltage generation circuit 160_3 generates the green gray scale voltages GGV[<N−1>:0] by receiving and dividing the green tap voltages GIV[<X−1>:0] generated by the second master gray scale voltage generation circuit 150_2 through the green tap voltage transmission lines GTL.

A blue gray scale voltage generation circuit included in the third slave gray scale voltage generation circuit 160_3 generates the blue gray scale voltages BGV[<N−1>: 0] by receiving and dividing the blue tap voltages BIV[<X−1>:0] generated by the third master gray scale voltage generation circuit 150_3.

The fourth column driver IC 140_4 includes the fourth master gray scale voltage generation circuit 150_4, and the fourth slave gray scale voltage generation circuit 160_4 may be identical or similar in structure to the first slave gray scale voltage generation circuit 160_1.

A red gray scale voltage generation circuit included in the fourth slave gray scale voltage generation circuit 160_4 generates the red gray scale voltages RGV[<N−1>:0] by receiving and dividing the red tap voltages RIV[<X−1>:0] generated by the first master gray scale voltage generation circuit 150_1 through the red tap voltage transmission lines RTL.

A green gray scale voltage generation circuit included in the fourth slave gray scale voltage generation circuit 160_4 generates the green gray scale voltages GGV[<N−1>:0] by receiving and dividing the green tap voltages GIV[<X−1>:0] generated by the second master gray scale voltage generation circuit 150_2 through the green tap voltage transmission lines GTL.

A blue gray scale voltage generation circuit included in the fourth slave gray scale voltage generation circuit 160_4 generates the blue gray scale voltages BGV[<N−1>:0] by receiving and dividing the blue tap voltages BIV[<X−1>:0] generated by the third master gray scale voltage generation circuit 150_3 through the blue tap voltage transmission lines BTL.

A structure of each of the decoders 170_2, 170_3, and 170_4 may be identical or similar in structure to the first decoder 170_1 and include a red decoder, a green decoder, and a blue decoder. An operation of each of the red decoder, the green decoder, and the blue decoder included in each of the decoders 170_2, 170_3, and 170_4 may be identical to the operation of each of the red decoder 170_1R, the green decoder 170_1G, and the blue decoder 170_1B, and thus, additional description will be omitted to avoid redundancy.

A low-power mode control signal LP_MODE may control the enabling and the disabling of each of the slave gray scale voltage generation circuits 160_1 to 160_4, the source amplifiers of each group, and each of the low-power mode amplifiers 172_1 to 172_4.

According to embodiments, each of the column driver ICs 140_1 to 140_4, as well as column driver ICs 140_1 ', 140_1*a* to 140_4*a*, and 140_1*b* to 140_4*b* described below, may further include a control pin capable of receiving the low-power mode control signal LP_MODE; when the low-power mode control signal LP_MODE indicating the normal mode is input to the control pin, each of the slave gray scale voltage generation circuits 160_1 to 160_4 and the source amplifiers of each group are enabled, and each of the low-power mode amplifiers 172_1 to 172_4 are disabled.

Also, when the low-power mode control signal LP_MODE indicating the low-power mode is input to the control pin, each of the slave gray scale voltage generation circuits 160_1 to 160_4 and the source amplifiers of each group are disabled, and each of the low-power mode amplifiers 172_1 to 172_4 are enabled. The enabling and disabling described above may be applied to each of low-power mode amplifiers 174_1 to 174_4 and 176_1 to 176_4 illustrated in FIG. 5 without modification.

According to embodiments, each of column driver IC modules 130, 130*a*, or 130*b* may further include a controller that receives and parses a mode control command, and the controller may generate the low-power mode control signal LP_MODE capable of controlling the enabling of each of the slave gray scale voltage generation circuits 160_1 to 160_4 and the source amplifiers of each group and controlling the disabling of each of the low-power mode amplifiers 172_1 to 172_4, depending on the mode control command directing the normal mode.

Also, depending on the mode control command directing the low-power mode, the controller may generate the low-power mode control signal LP_MODE capable of controlling the disabling of each of the slave gray scale voltage generation circuits 160_1 to 160_4 and the source amplifiers of each group and controlling the enabling of each of the low-power mode amplifiers 172_1 to 172_4.

Figure 3:
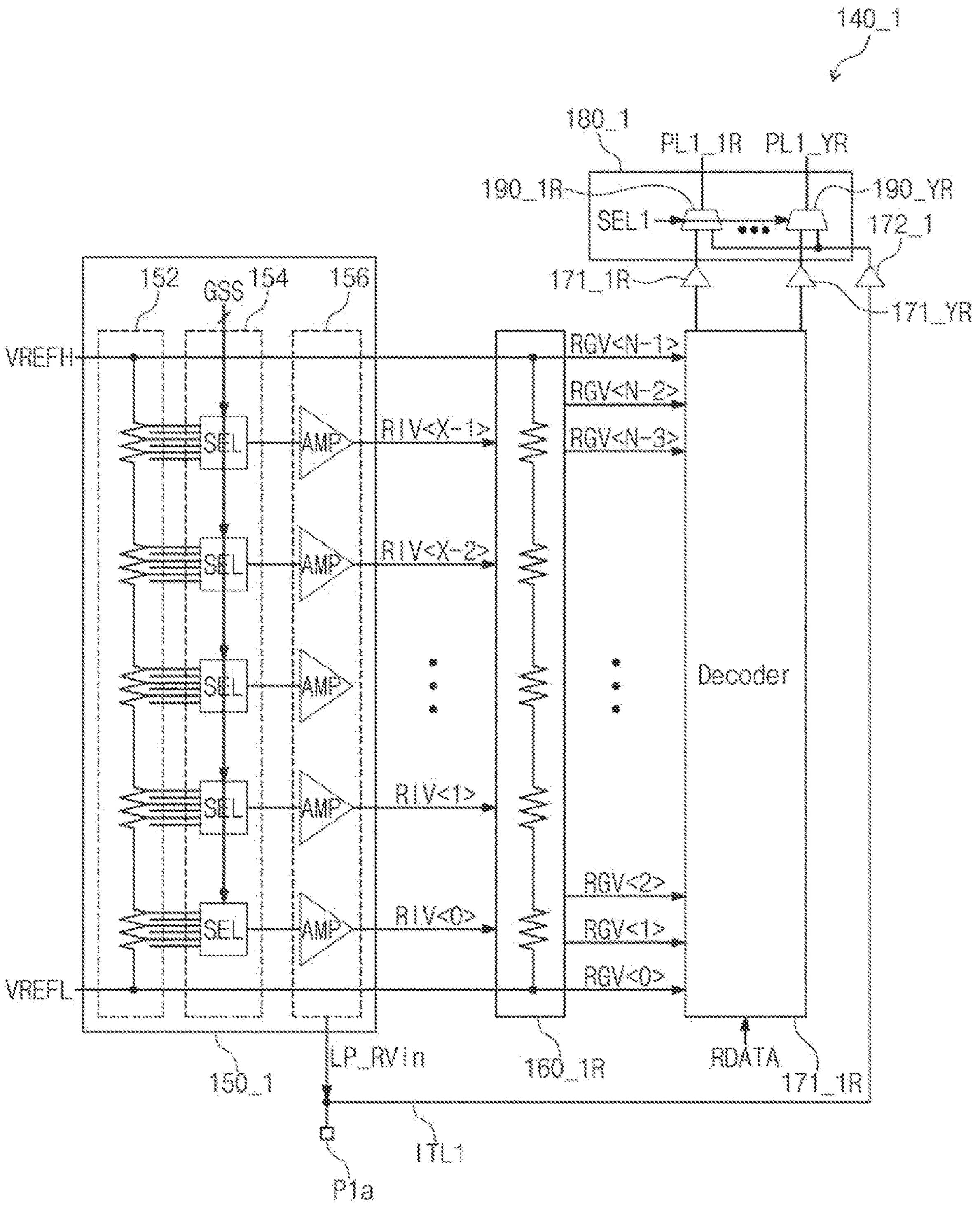
FIG. 3 is a conceptual diagram of a first master gray scale voltage generation circuit, a red slave gray scale voltage generation circuit, and a red decoder illustrated in FIG. 2, according to an embodiment.

FIG. 3 is a conceptual diagram of a first master gray scale voltage generation circuit, a red slave gray scale voltage generation circuit, and a red decoder illustrated in FIG. 2.

Referring to FIGS. 1 to 3, the first master gray scale voltage generation circuit 150_1 includes a voltage division circuit 152, a selecting circuit 154, and a buffer circuit 156.

The voltage division circuit 152 includes a resistor string including resistors connected in series, receives reference voltages including a first reference voltage VREFH and a second reference voltage VREFL, and divides the first and second reference voltages VREFH and VREFL to generate voltages. For example, a level of the first reference voltage VREFH may be higher than a level of the second reference voltage VREFL. For example, the second reference voltage VREFL may be a ground voltage.

The selecting circuit 154 includes a plurality of selectors SEL, and each of the plurality of selectors SEL receives corresponding voltages of voltages generated by the voltage division circuit 152, selects one of the received corresponding voltages in response to selection signals GSS, and output the selected voltage.

The buffer circuit 156 include a plurality of amplifiers AMP respectively corresponding to the selectors SEL, and each of the plurality of amplifiers AMP receives and amplifies an output signal of the corresponding each of the plurality of selectors SEL and generates a corresponding red tap voltage of the red tap voltages RIV[<X−1>:0].

The red gray scale voltage generation circuit 160_1R includes a resistor string including resistors connected in series and receives and divides the red tap voltages RIV[<X−1>:0] to generate red gray scale voltages RGV[<N−1>:0] (where N is a natural number of 2 or more).

When the low-power mode control signal LP_MODE indicates an operation in the low-power mode, each of the slave gray scale voltage generation circuits 160_1 to 160_4 and the source amplifiers of each group driving the pixel lines PL1_1 to PL1_Y, PL2_1 to PL2_Y, PL3_1 to PL3_Y, and PL4_1 to PL44_Y of each group are disabled. Accordingly, because a static current consumed in the source amplifiers of each group in the low-power mode decreases, power consumption of each of the column driver ICs 140_1 to 140_4 also decreases.

The first switch circuit 180_1 includes a plurality of selecting circuits. Because each of the plurality of switch circuits 180_1 to 180_4 have the same structure, the structure and operation of the first switch circuit 180_1 will be described as an example.

For convenience of description, selecting circuits 190_1R to 190_YR connected with the red source amplifiers 171_1R to 171_YR are illustrated in FIG. 3. Each of the selecting circuits 190_1R to 190_YR may be implemented with a multiplexer.

When the first selection signal SEL1 indicates an operation in the low-power mode, each of the selecting circuits 190_1R to 190_YR transfers an output signal of the first low-power mode amplifier 172_1 to each of the pixel lines PL1_1R to PL1_YR.

When the first selection signal SEL1 indicates an operation in the normal mode, each of the selecting circuits 190_1R to 190_YR transfers output signal of each of the red source amplifiers 171_1R to 171_YR to each of the pixel lines PL1_1R to PL1_YR.

In the low-power mode, each of the plurality of switch circuits 180_1 to 180_4 of each of the column driver ICs 140_1 to 140_4 transfers (e.g., simultaneously transfers) output signal of each of the low-power mode amplifiers 172_1 to 172_4 to the pixel lines PL1_1 to PL1_Y, PL2_1 to PL2_Y, PL3_1 to PL3_Y, and PL4_1 to PL4_Y depending on each of the selection signals SEL1 to SEL4.

Figure 4:
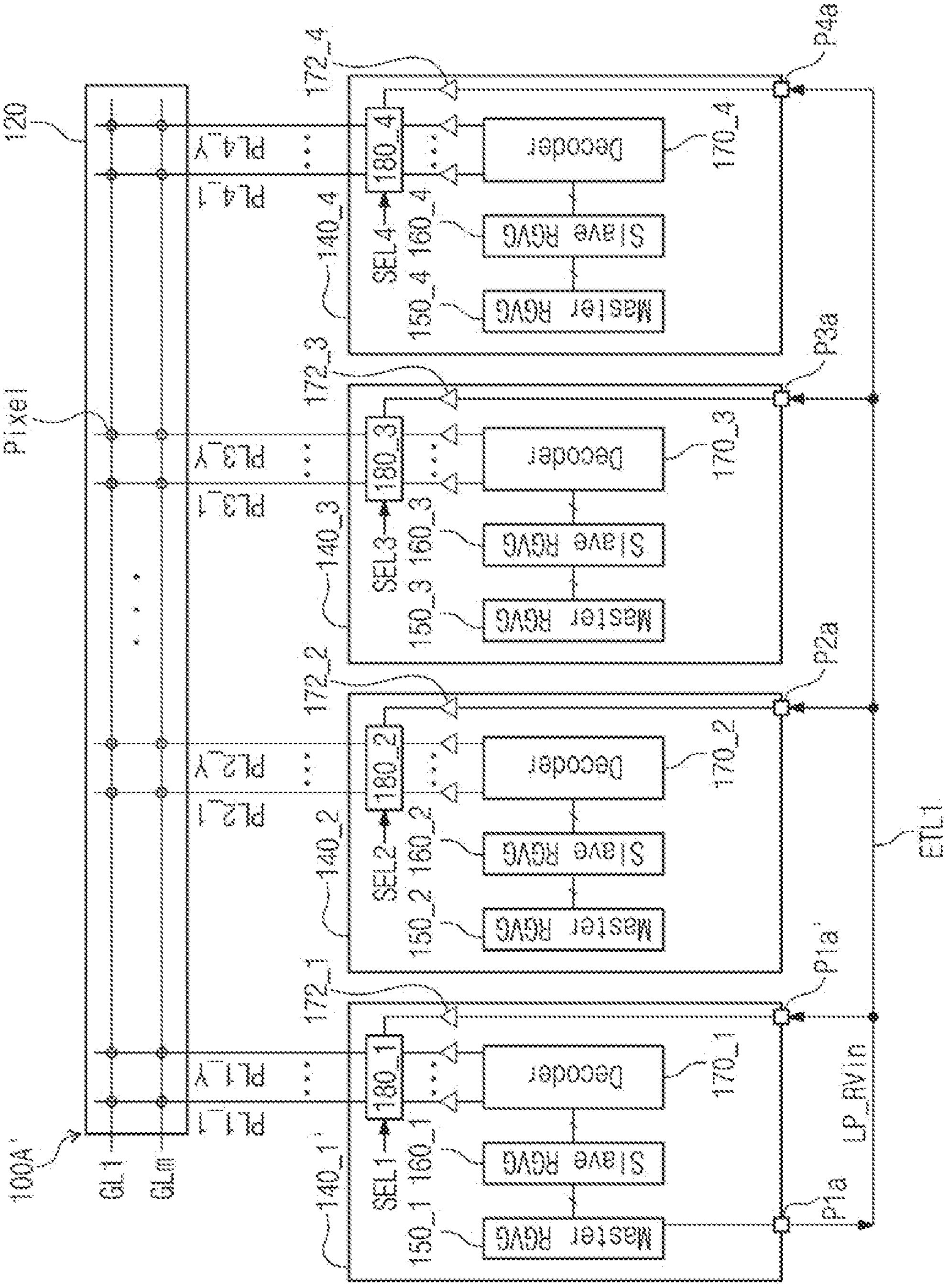
FIG. 4 is a block diagram of a display device including column driver ICs according to embodiments.

FIG. 4 is a block diagram of a display device including column driver ICs according to embodiments of the present disclosure.

Referring to FIGS. 1 and 4, a structure of the first column driver IC 140_1' and a connecting relationship of the tap transmission lines RTL, GTL, and BTL of the display device 100A of FIG. 1 are identical to the structure of the first column driver IC 140_1 and the connecting relationship of the tap transmission lines RTL, GTL, and BTL of the display device 100A' of FIG. 4, except that a pin P1*a*' is implemented in the first column driver IC 140_1 instead of the internal transmission line ITL1.

The low-power mode gray scale voltage LP_RVin output to the external transmission line ETL1 through the first pin P1*a* is transferred to each of the input terminals of the low-power mode amplifiers 172_1, 172_2, 172_3, and 172_4 through each of pins P1*a*', P2*a*, P3*a*, and P4*a*.

Figure 5:
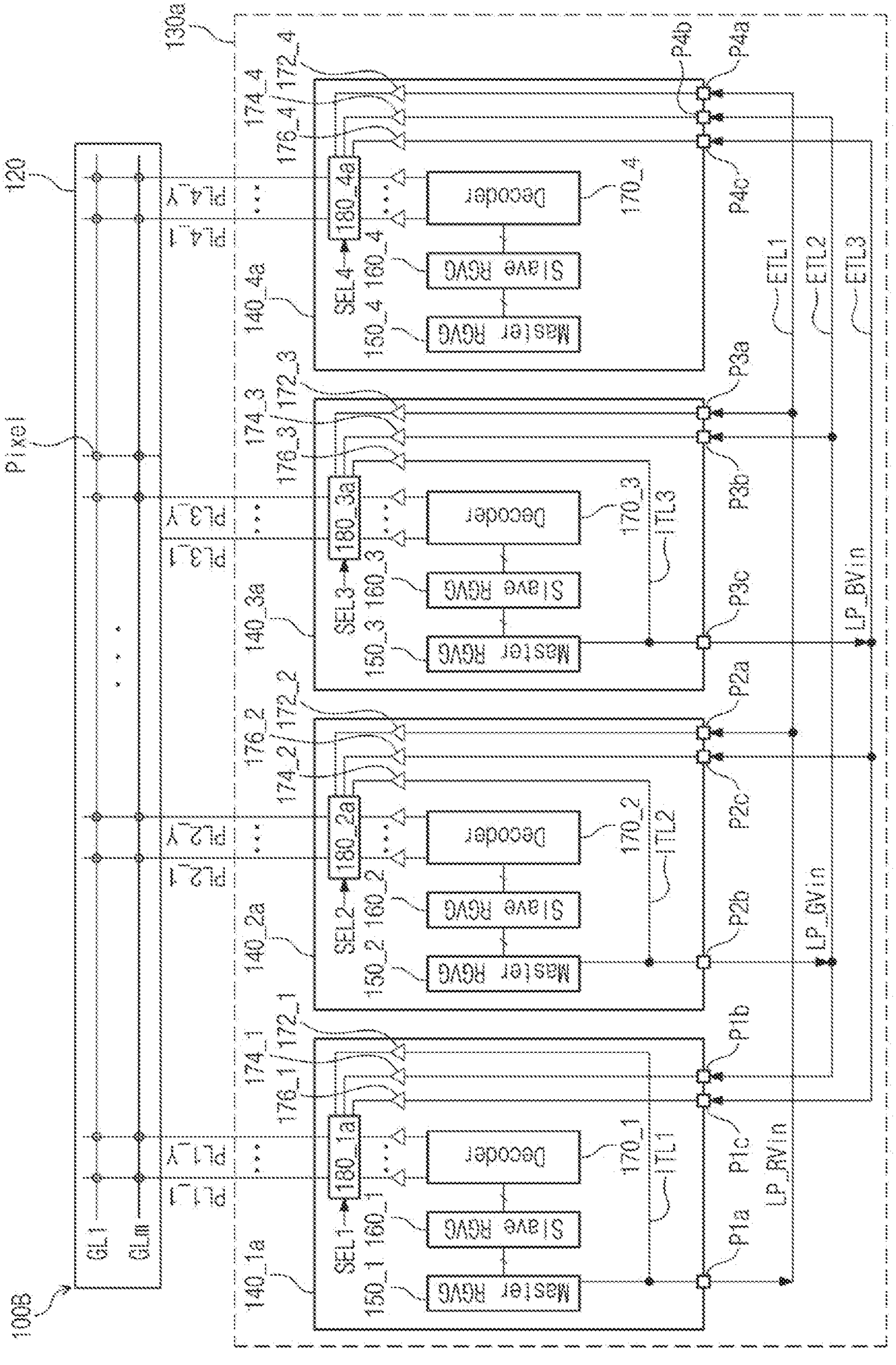
FIG. 5 is a block diagram of a display device including column driver ICs according to embodiments.

FIG. 5 is a block diagram of a display device including column driver ICs according to embodiments of the present disclosure.

Referring to FIG. 5, the display device 100B includes the display panel 120 and the column driver IC module 130*a*, and the column driver IC module 130*a* includes the plurality of column driver ICs 140_1 to 140_4, the first external transmission line ETL1, a second external transmission line ETL2, a third external transmission line ETL3, the red tap voltage transmission lines RTL, the green tap voltage transmission lines GTL, and the blue tap voltage transmission lines BTL.

A connecting relationship of the tap transmission lines RTL, GTL, and BTL of the display device 100B of FIG. 5 is identical to the connecting relationship of the tap transmission lines RTL, GTL, and BTL of the display device 100A of FIG. 1.

The first master gray scale voltage generation circuit 150_1 of the first column driver IC 140_1*a* divides the received reference voltages VREF to generate the red tap voltages RIV[<X−1>:0], outputs the red tap voltages RIV[<X−1>:0] directly to the first slave gray scale voltage generation circuit 160_1, and outputs the red tap voltages RIV[<X−1>:0] to each of the slave gray scale voltage generation circuits 160_2, 160_3, and 160_4 through the red tap voltage transmission lines RTL.

The second master gray scale voltage generation circuit 150_2 of the second column driver IC 140_2*a* divides the received reference voltages VREF to generate the green tap voltages GIV[<X−1>:0], outputs the green tap voltages GIV[<X−1>:0] directly to the second slave gray scale voltage generation circuit 160_2, and outputs the green tap voltages GIV[<X−1>:0] to each of the slave gray scale voltage generation circuits 160_1, 160_3, and 160_4 through the green tap voltage transmission lines GTL.

The third master gray scale voltage generation circuit 150_3 of the third column driver IC 140_3*a* divides the received reference voltages VREF to generate the blue tap voltages BIV[<X−1>:0], outputs the blue tap voltages BIV[<X−1>:0] directly to the third slave gray scale voltage generation circuit 160_3, and outputs the blue tap voltages BIV[<X−1>:0] to each of the slave gray scale voltage generation circuits 160_1, 160_2, and 160_4 through the blue tap voltage transmission lines BTL.

The first master gray scale voltage generation circuit 150_1 of FIG. 5 generates the first low-power mode gray scale voltage LP_RVin by using at least one of the red tap voltages RIV[<X−1>:0] and outputs the first low-power mode gray scale voltage LP_RVin to the input terminal of the first low-power mode amplifier 172_1 through the first internal transmission line ITL1. The first low-power mode gray scale voltage LP_RVin is transferred to the first external transmission line ETL1 through the first pin P1*a*.

Because each of the pins P2*a*, P3*a*, and P4*a* implemented in each of the column driver ICs 140_2*a*, 140_3*a*, and 140_4*a* are connected with the first external transmission line ETL1, the first low-power mode gray scale voltage LP_RVin generated by the first master gray scale voltage generation circuit 150_1 are transferred to each of the input terminals of the low-power mode amplifiers 172_2, 172_3, and 172_4 through each of the pins P2*a*, P3*a*, and P4*a*.

The second master gray scale voltage generation circuit 150_2 generates a second low-power mode gray scale voltage LP_GVin by using at least one of the green tap voltages GIV[<X−1>:0] and outputs the second low-power mode gray scale voltage LP_GVin to the input terminal of the second low-power mode amplifier 174_2 through a second internal transmission line ITL2. The second low-power mode gray scale voltage LP_GVin is transferred to the second external transmission line ETL2 through a fifth pin P2*b*.

Because each of pins P1*b*, P3*b*, and P4*b* implemented in each of the column driver ICs 140_1*a*, 140_3*a*, and 140_4*a* are connected with the second external transmission line ETL2, the second low-power mode gray scale voltage LP_GVin generated by the second master gray scale voltage generation circuit 150_2 are transferred to each of the input terminals of the low-power mode amplifiers 174_1, 174_3, and 174_4 through each of the pins P1*b*, P3*b*, and P4*b*.

The third master gray scale voltage generation circuit 150_3 generates a third low-power mode gray scale voltage LP_BVin by using at least one of the blue tap voltages BIV[<X−1>:0], and outputs the third low-power mode gray scale voltage LP_BVin to the input terminal of the third low-power mode amplifier 176_3 through a third internal transmission line ITL3. The third low-power mode gray scale voltage LP_BVin is transferred to the third external transmission line ETL3 through a sixth pin P3*c*.

Because each of pins P1*c*, P2*c*, and P4*c* implemented in each of the column driver ICs 140_1*a*, 140_2*a*, and 140_4*a* are connected with the third external transmission line ETL3, the third low-power mode gray scale voltage LP_BVin generated by the third master gray scale voltage generation circuit 150_3 are transferred to each of the input terminals of the low-power mode amplifiers 176_1, 176_3, and 176_4 through each of the pins P1*c*, P2*c*, and P4*c*. According to embodiments, each of the low-power mode gray scale voltages LP_RVin, LP_GVin, and LP_BVin may be equal to each other or may be different from each other.

Figure 6:
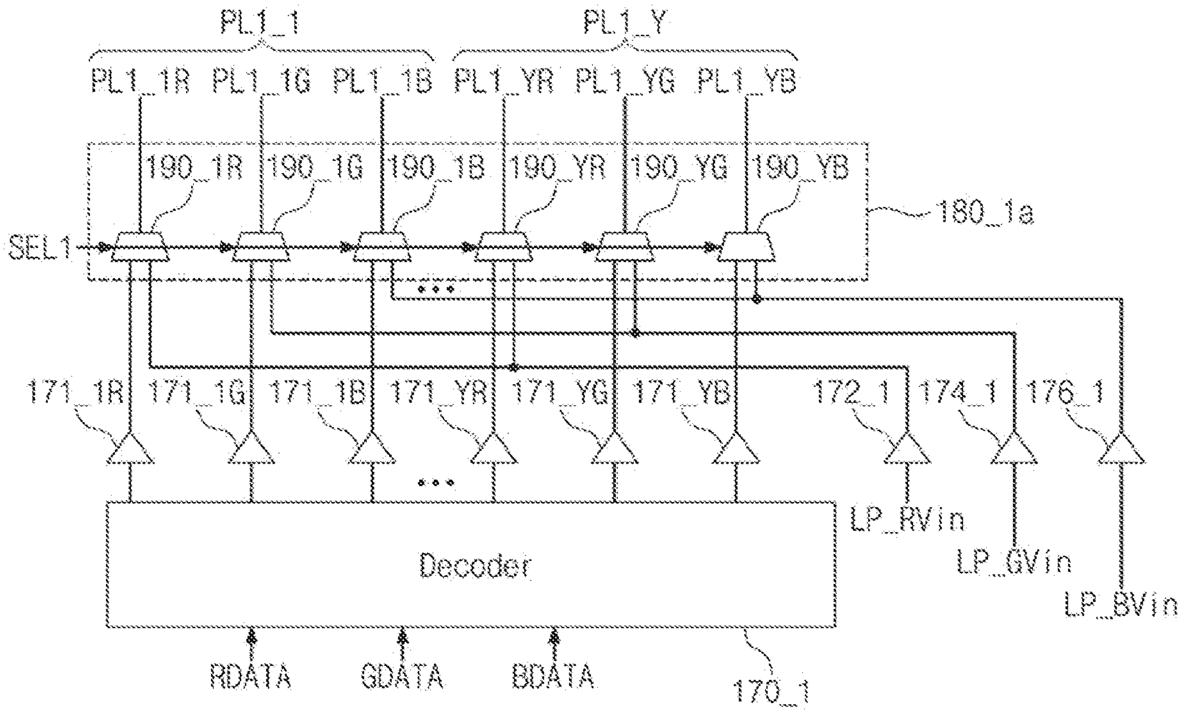
FIG. 6 is a conceptual diagram of a switch circuit illustrated in FIG. 5, according to an embodiment.

FIG. 6 is a conceptual diagram of a first switch circuit illustrated in FIG. 5. Because each of the switch circuits 180_1*a* to 180_4*a* have the same structure and perform the same operation, the structure and operation of the first switch circuit 180_1*a* will be described as an example.

Referring to FIGS. 5 and 6, when the first selection signal SEL1 indicates an operation in the low-power mode, each of selecting circuits 190_1R to 190_YR transfers an output signal of the first low-power mode amplifier 172_1 to the pixel lines PL1_1R to PL1_YR, each of selecting circuits 190_1G to 190_YG transfers an output signal of a low-power mode amplifier 174_1 to the pixel lines PL1_1G to PL1_YG, and selecting circuits 190_1B to 190_YB transfers an output signal of a low-power mode amplifier 176_1 to the pixel lines PL1_1B to PL1_YB.

When the first selection signal SEL1 indicates an operation in the normal mode, each of the selecting circuits 190_1R to 190_YR transfers output signal of each of the source amplifiers 171_1R to 171_YR to each of the pixel lines PL1_1R to PL1_YR, each of the selecting circuits 190_1G to 190_YG transfers output signal of each of the source amplifiers 171_1G to 171_YG to each of the pixel lines PL1_1G to PL1_YG, and each of the selecting circuits 190_1B to 190_YB transfers output signal of each of the source amplifiers 171_1B to 171_YB to each of the pixel lines PL1_1B to PL1_YB.

A structure of the first decoder 170_1 is identical to the structure of the first decoder 170_1 illustrated in FIG. 2, and thus, additional description will be omitted to avoid redundancy.

In response to the first selection signal SEL1 indicating the normal mode, the first switch circuit 180_1*a* transfers output signals of the first group of source amplifiers to the first group of pixel lines PL1_1 to PL1_Y; in response to the first selection signal SEL1 indicating the low-power mode, the first switch circuit 180_1*a* transfers the output signal of the low-power mode amplifier 172_1 to red pixel lines of the first group of pixel lines PL1_1 to PL1_Y, transfers the output signal of the low-power mode amplifier 174_1 to green pixel lines of the first group of pixel lines PL1_1 to PL1_Y, and transfers the output signal of the low-power mode amplifier 176_1 to blue pixel lines of the first group of pixel lines PL1_1 to PL1_Y.

Referring again to FIG. 5, in response to the second selection signal SEL2 indicating the normal mode, the second switch circuit 180_2*a* transfers output signals of the second group of source amplifiers to the second group of pixel lines PL2_1 to PL2_Y; in response to the second selection signal SEL2 indicating the low-power mode, the second switch circuit 180_2*a* transfers the output signal of the low-power mode amplifier 172_2 to red pixel lines of the second group of pixel lines PL2_1 to PL2_Y, transfers the output signal of the low-power mode amplifier 174_2 to green pixel lines of the second group of pixel lines PL2_1 to PL2_Y, and transfers the output signal of the low-power mode amplifier 176_2 to blue pixel lines of the second group of pixel lines PL2_1 to PL2_Y.

In response to the third selection signal SEL3 indicating the normal mode, the third switch circuit 180_3*a* transfers output signals of the third group of source amplifiers to the third group of pixel lines PL3_1 to PL3_Y; in response to the third selection signal SEL3 indicating the low-power mode, the third switch circuit 180_3*a* transfers the output signal of the low-power mode amplifier 172_3 to red pixel lines of the third group of pixel lines PL3_1 to PL3_Y, transfers the output signal of the low-power mode amplifier 174_3 to green pixel lines of the third group of pixel lines PL3_1 to PL3_Y, and transfers the output signal of the low-power mode amplifier 176_3 to blue pixel lines of the third group of pixel lines PL3_1 to PL3_Y.

In response to the fourth selection signal SEL4 indicating the normal mode, the fourth switch circuit 180_4*a* transfers output signals of the fourth group of source amplifiers to the fourth group of pixel lines PL4_1 to PL4_Y; in response to the fourth selection signal SEL4 indicating the low-power mode, the fourth switch circuit 180_4*a* transfers the output signal of the low-power mode amplifier 172_4 to red pixel lines of the fourth group of pixel lines PL4_1 to PL4_Y, transfers the output signal of the low-power mode amplifier 174_4 to green pixel lines of the fourth group of pixel lines PL4_1 to PL4_Y, and transfers the output signal of the low-power mode amplifier 176_4 to blue pixel lines of the fourth group of pixel lines PL4_1 to PL4_Y.

In the normal mode, each of the selection signals SEL1 to SEL4 may be the same signal. In the low-power mode, each of the selection signals SEL1 to SEL4 may be the same signal.

Figure 7:
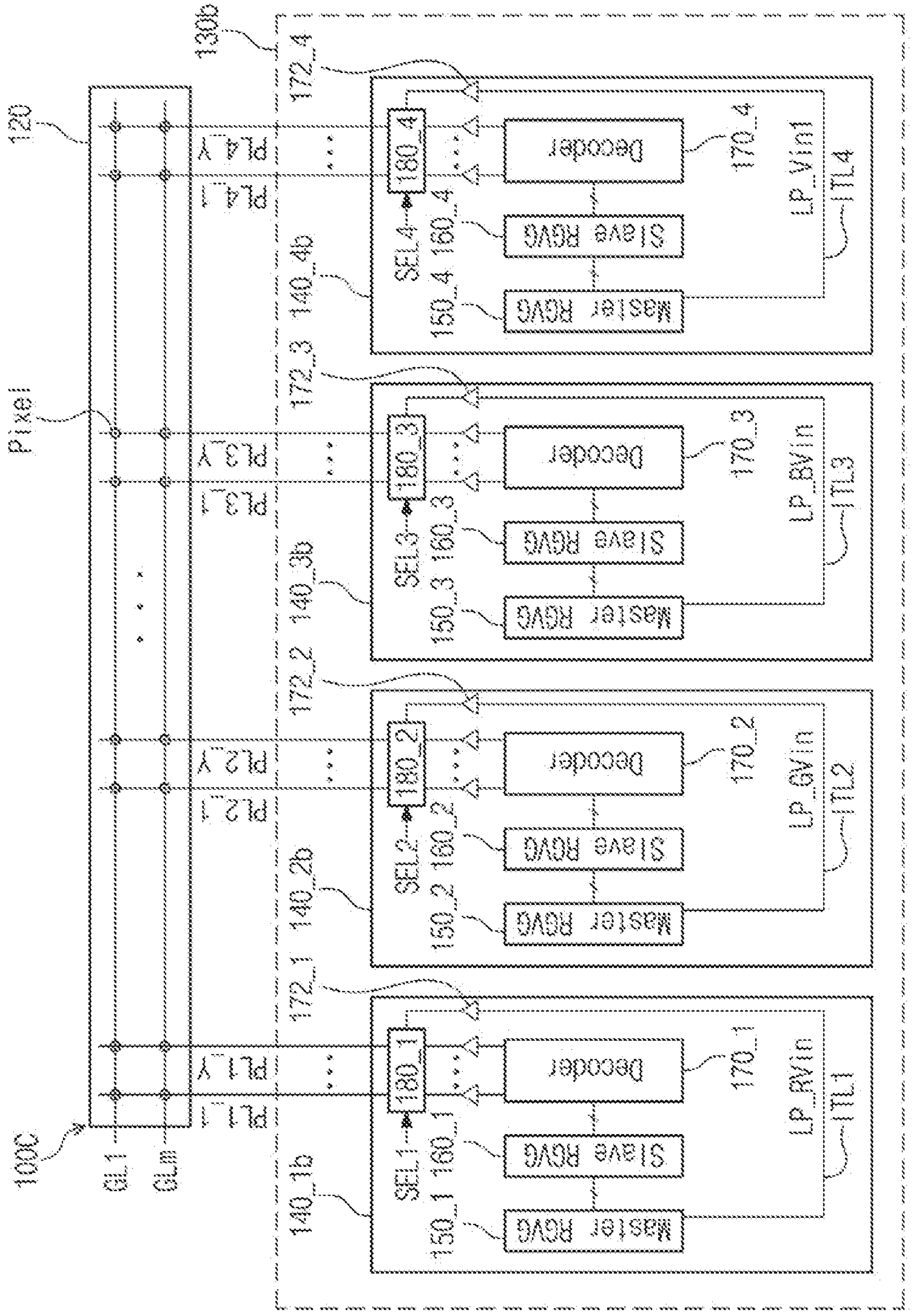
FIG. 7 is a block diagram of a display device including column driver ICs according to an embodiment.

FIG. 7 is a block diagram of a display device including column driver ICs according to an embodiment of the present disclosure.

Referring to FIG. 7, the display device 100C includes the display panel 120 and the column driver IC module 130*b*, and the column driver IC module 130*b* includes the plurality of column driver ICs 140_1*b* to 140_4*b*.

The first master gray scale voltage generation circuit 150_1 of FIG. 7 generates the first low-power mode gray scale voltage LP_RVin by using at least one of the red tap voltages RIV[<X−1>:0] and outputs the first low-power mode gray scale voltage LP_RVin to the input terminal of the first low-power mode amplifier 172_1 through the first internal transmission line ITL1.

The second master gray scale voltage generation circuit 150_2 of FIG. 7 generates the second low-power mode gray scale voltage LP_GVin by using at least one of the green tap voltages GIV[<X−1>:0] and outputs the second low-power mode gray scale voltage LP_GVin to the input terminal of the second low-power mode amplifier 172_2 through the second internal transmission line ITL2.

The third master gray scale voltage generation circuit 150_3 of FIG. 7 generates the third low-power mode gray scale voltage LP_BVin by using at least one of the blue tap voltages BIV[<X−1>:0] and outputs the third low-power mode gray scale voltage LP_BVin to the input terminal of the third low-power mode amplifier 172_3 through the third internal transmission line ITL3.

The fourth master gray scale voltage generation circuit 150_4 of FIG. 7 generates a fourth low-power mode gray scale voltage LP_Vin1 by using at least one of the tap voltages and outputs the fourth low-power mode gray scale voltage LP_Vin1 to the input terminal of the fourth low-power mode amplifier 172_4 through a fourth internal transmission line ITL4. According to embodiments, a structure of the fourth master gray scale voltage generation circuit 150_4 may be identical to a structure of the first master gray scale voltage generation circuit 150_1. According to embodiments, each of the low-power mode gray scale voltages LP_RVin, LP_GVin, LP_BVin, and LP_Vin1 may be equal to each other or may be different from each other.

According to embodiments, the same reference voltages VREF or different reference voltages VREF may be supplied to each of the column driver ICs 140_1 to 140_4, 140_1', 140_1*a* to 140_4*a*, and 140_1*b* to 140_4*b*.

A column driver IC according to an embodiment of the present disclosure may enable a slave gray scale voltage generation circuit, which divides tap voltages to generate gray scale voltages, and source amplifiers in the low-power mode and may drive pixel lines implemented in a display panel by using a low-power gray scale voltage generated based on at least one of the tap voltages generated by a master gray scale voltage generation circuit.

While the present disclosure has been described with reference to particular embodiments, it will be apparent to those of ordinary skill in the art that various changes and modifications may be made thereto without departing from the spirit and scope of the present disclosure as set forth in the following claims.

What is claimed is:

1. A column driver integrated circuit (IC) which drives a first group of pixel lines connected to a first group of pixels included in a display panel, and a second group of pixel lines connected to a second group of pixels included in the display panel, the column driver IC comprising:

a master gray scale voltage generation circuit configured to:

divide a reference voltage to generate tap voltages, and generate a first low-power mode gray scale voltage based on at least one of the tap voltages;

a plurality of first source amplifiers configured to drive the first group of pixel lines based on gray scale voltages corresponding to the tap voltages;

a first low-power mode amplifier separated from the plurality of first source amplifiers and configured to drive the first group of pixel lines based on only the first low-power mode gray scale voltage; and a first pin configured to provide the first low-power mode gray scale voltage to an outside of the column driver IC.

2. The column driver IC of claim 1, further comprising an internal transmission line configured to supply the first low-power mode gray scale voltage to an input terminal of the first low-power mode amplifier.

3. The column driver IC of claim 1, further comprising a second pin configured to:

receive the first low-power mode gray scale voltage from the first pin through an external transmission line, and supply the received first low-power mode gray scale voltage to an input terminal of the first low-power mode amplifier.

4. The column driver IC of claim 1, further comprising:

a second pin configured to receive a second low-power mode gray scale voltage from an external column driver IC; and a second low-power mode amplifier configured to drive the second group of pixel lines based on the second low-power mode gray scale voltage received through the second pin.

5. The column driver IC of claim 1, further comprising a decoder configured to provide the tap voltages to the plurality of first source amplifiers, wherein the first low-power mode amplifier is configured to receive the first low-power mode gray scale voltage directly from the master gray scale voltage generation circuit.

6. A column driver integrated circuit (IC) module comprising:

a first column driver IC configured to drive a first group of pixel lines included in a display panel; and a second column driver IC configured to drive a second group of pixel lines included in the display panel, wherein the first column driver IC comprises:

a first master gray scale voltage generation circuit configured to divide a first reference voltage to generate first tap voltages, and to generate a first low-power mode gray scale voltage based on at least one of the first tap voltages;

a plurality of first source amplifiers configured to drive the first group of pixel lines based on gray scale voltages corresponding to the first tap voltages;

a first low-power mode amplifier separated from the plurality of first source amplifiers and configured to drive the first group of pixel lines based on only the first low-power mode gray scale voltage; and a first pin configured to provide the first low-power mode gray scale voltage to an outside of the first column driver IC.

7. The column driver IC module of claim 6, wherein the first column driver IC further comprises an internal transmission line configured to provide the first low-power mode gray scale voltage to an input terminal of the first low-power mode amplifier.

8. The column driver IC module of claim 6, wherein the second column driver IC comprises:

a second pin configured to receive the first low-power mode gray scale voltage; and a second low-power mode amplifier configured to drive the second group of pixel lines based on the first low-power mode gray scale voltage received through the second pin, and wherein the column driver IC module further comprises an external transmission line connected between the first pin and the second pin.

9. The column driver IC module of claim 8, further comprising a third pin connected to the external transmission line and to an input terminal of the first low-power mode amplifier.

10. The column driver IC module of claim 6, wherein the first column driver IC further comprises a second low-power mode amplifier configured to drive a third group of pixel lines included in the display panel based on a second low-power mode gray scale voltage received from the second column driver IC.

11. The column driver IC module of claim 10, wherein the first column driver IC further comprises:

a second pin configured to receive the second low-power mode gray scale voltage and to provide the second low-power mode gray scale voltage to an input terminal of the second low-power mode amplifier, wherein the second column driver IC comprises:

a third pin configured to receive the first low-power mode gray scale voltage;

a third low-power mode amplifier configured to drive the second group of pixel lines based on the first low-power mode gray scale voltage received through the third pin;

a second master gray scale voltage generation circuit configured to divide a second reference voltage to generate second tap voltages, and to generate the second low-power mode gray scale voltage based on at least one of the second tap voltages;

a fourth low-power mode amplifier configured to drive a fourth group of pixel lines included in the display panel based on the second low-power mode gray scale voltage; and a fourth pin configured to provide the second low-power mode gray scale voltage, and wherein the column driver IC module further comprises:

a first external transmission line connected between the first pin and the third pin; and a second external transmission line connected between the second pin and the fourth pin.

12. The column driver IC module of claim 6, wherein the second column driver IC comprises:

a second master gray scale voltage generation circuit configured to divide a second reference voltage to generate second tap voltages and to generate a second low-power mode gray scale voltage based on at least one of the second tap voltages; and a second low-power mode amplifier configured to drive the second group of pixel lines based on the second low-power mode gray scale voltage.

13. A display device comprising:

a display panel comprising a first group of pixel lines connected to a first group of pixels, and a second group of pixel lines connected to a second group of pixels; and a column driver integrated circuit (IC) module comprising a first column driver IC connected to the first group of pixel lines and a second column driver IC connected to the second group of pixel lines, wherein the first column driver IC comprises:

a first master gray scale voltage generation circuit configured to divide a first reference voltage to generate first tap voltages, and to generate a first low-power mode gray scale voltage based on at least one of the first tap voltages;

a plurality of first source amplifiers configured to drive the first group of pixel lines based on gray scale voltages corresponding to the first tap voltages; and a first low-power mode amplifier separated from the plurality of first source amplifiers and configured to drive the first group of pixel lines based on only the first low-power mode gray scale voltage; and a first pin configured to provide the first low-power mode gray scale voltage to an outside of the first column driver IC.

14. The display device of claim 13, wherein the first column driver IC further comprises an internal transmission line configured to supply the first low-power mode gray scale voltage to an input terminal of the first low-power mode amplifier.

15. The display device of claim 13, wherein the second column driver IC comprises:

a second pin configured to receive the first low-power mode gray scale voltage; and a second low-power mode amplifier configured to drive the second group of pixel lines based on the first low-power mode gray scale voltage received through the second pin, and wherein the column driver IC module further comprises an external transmission line connected between the first pin and the second pin.

16. The display device of claim 15, wherein the first column driver IC further comprises a third pin connected to an input terminal of the first low-power mode amplifier and to the external transmission line.

17. The display device of claim 13, wherein the display panel further comprises a third group of pixel lines connected to a third group of pixels, and wherein the first column driver IC further comprises a second low-power mode amplifier configured to drive the third group of pixel lines based on a second low-power mode gray scale voltage received from the second column driver IC.

18. The display device of claim 17, wherein the display panel further comprises a fourth group of pixel lines connected to a fourth group of pixels, wherein the first column driver IC comprises:

a second pin configured to provide the second low-power mode gray scale voltage to an input terminal of the second low-power mode amplifier, wherein the second column driver IC comprises:

a third pin configured to receive the first low-power mode gray scale voltage;

a third low-power mode amplifier configured to drive the second group of pixel lines based on the first low-power mode gray scale voltage received through the third pin;

a second master gray scale voltage generation circuit configured to divide a second reference voltage to generate second tap voltages, and to generate the second low-power mode gray scale voltage based on at least one of the second tap voltages;

a fourth low-power mode amplifier configured to drive the fourth group of pixel lines based on the second low-power mode gray scale voltage; and a fourth pin configured to provide the second low-power mode gray scale voltage to an outside of the second column driver IC, and wherein the column driver IC module further comprises: and a first external transmission line connected between the first pin and the third pin; and a second external transmission line connected between the second pin and the fourth pin.

19. The display device of claim 18, wherein the first group of pixels includes first organic light-emitting diode (OLED) pixels, wherein each of the first OLED pixels includes one of a red pixel, a green pixel, and a blue pixel, wherein the second group of pixels includes second OLED pixels, and wherein each of the second OLED pixels includes another of the red pixel, the green pixel, and the blue pixel.

* * * * *